Feb. 23, 1954     W. M. STITELER     2,669,799
FISHERMAN'S FLY BOX
Filed March 26, 1951

Inventor
WILLIAM M. STITELER
By Chas W Hull
Attorney

Patented Feb. 23, 1954

2,669,799

UNITED STATES PATENT OFFICE 2,669,799

FISHERMAN'S FLY BOX

William M. Stiteler, Camp Hill, Pa.

Application March 26, 1951, Serial No. 217,521

6 Claims. (Cl. 43—57.5)

The present improvements relate, in general, to means for storing fish hooks, and more particularly to that class of hooks known as "flies" which are used in the type of fishing known as fly casting. The storing means is designed to accommodate an assortment of flies, individually mounted in spaced relation, for convenient storage, selection, removal and return after use.

A primary object of the improvements is to provide an improved container or receptacle for flies, which facilitates insertion or removal of the flies therefrom, particularly under adverse conditions. To this end, the improvements are designed for convenient access to the flies, but, at the same time, protecting them from windy conditions.

A further object of outstanding importance is the provision of a fly receptacle or container, to which access may be had for storing or removing the flies without the necessity of using the hands to hold the container.

Another object is the provision of an improved storing mechanism for flies, whereby the fisherman may thread the leader to the fly while the fly remains in the mount of the receptacle. As a further object, the improvements are designed to move a fly mounted in reclining position to elevated and erect positions, thereby exposing the eye for threading, without removal of the fly from the storage means. To this end, the improvements are designed to maintain tension or a taut condition between the fly mount and a support therefor.

Other objects include the provision of an endless belt in the form of a flexible fabric ribbon or mat, having improved fly mounts designed for economical manufacture. In that respect, a further object is to provide a cylindrical support for suspending the ribbon thereon, which is maintained in taut relation, not only for traction purposes, but also to insure erection or elevation of the eye of the fly to facilitate threading with a leader.

A further object is to provide a case, conveniently held during the fishing operation, as well as an improved mechanism for mounting and propelling a plurality of flies to facilitate replacement of flies while fishing.

These and other objects will be apparent, upon reference to the accompanying specification and drawings, which describe and illustrate one embodiment of the improvements.

Figure 1:
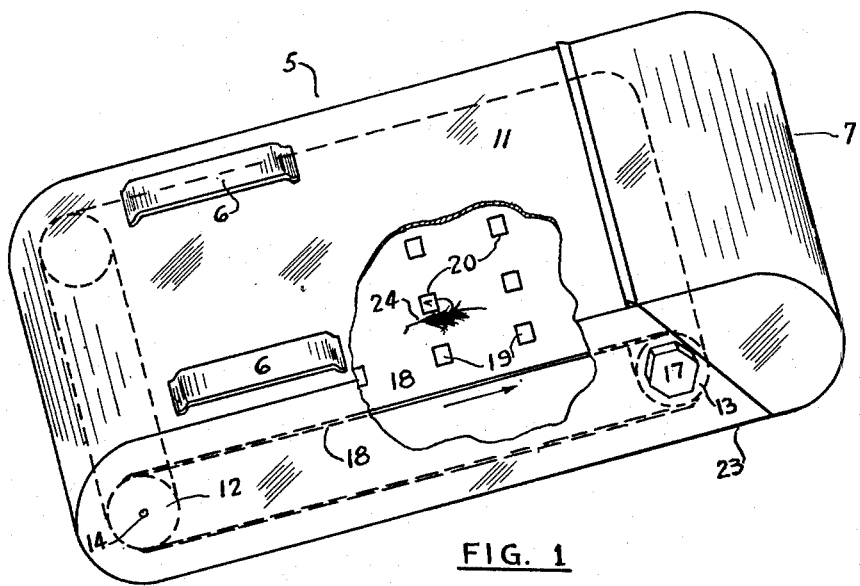
Figure 1 is a perspective view of a full size fly case or receptacle, illustrating one embodiment of the improvements, a portion of the front face and one side, being broken away; other parts being omitted.

The embodiment of the invention, chosen for illustration, consists of a case, container or receptacle 5 preferably made of transparent plastic material. Although opaque or other materials may be employed, the transparent character permits ready inspection of the entire contents, to permit choice of a particular fly. As illustrated, however, the case 5 is preferably made in oblong or rectangular form, either in the exact size of Figure 1 or slightly smaller to facilitate convenient use in the field.

The shape of the case, therefore, lends itself to easy mounting or attachment about the person of the fisherman. For example, it may be inserted in a pocket in the vest so that its upper portion may protrude; it may be tucked partly within the pants belt of the user; it may be supported, by means of straps 6, to the clothes of the person by a pin or buckle; it may be threaded by straps 6 onto the leather shoulder strap of the creel; and it may be temporarily held (even during the fishing operation, without requiring removal of the hands from the rod or net) between the forearm and chest of the user, much like a person might temporarily tuck a newspaper or the like, while both hands were occupied in the act of removing gloves.

The case 5 is open at one end, as distinguished from the sides or front and back faces thereof. This open end is particularly located at, what may be termed, the top, to provide features as hereinafter described. While the case embodying the present improvements, may be used, without a closure, the illustrated embodiment includes a cover 7 which is preferably, although not necessarily, removably secured by a hinge means 8 for supporting the cover in open, wind-shield position, as later described. Any chosen means may be provided for retaining the cover 7 in closed position, such as flange 9 on the cover and stud 10 in the face 11.

Adjacent the lower end of the case, a cylindrical support is provided in the form of a roller 12, which is suitably spaced from the inner walls. At the upper open end of the case, a second cylindrical support is provided in the form of a parallel roller 13, preferably having a solid surface throughout. In the device illustrated these rollers are made of wood, although other materials may be used.

The lower roller 12, is freely mounted on a support 14, which is secured in the lower side walls of the case. The upper roller 13 is suspended on supports 15 and 16, extending through the case, the support 16 being fixed to the roller so that both may be rotated by handle or knob 17. An endless belt, in the form of a ribbon 18, is suspended and looped over the rollers 12 and 13, and these rollers are mounted so as to maintain the ribbon taut and under tension, and with the looped opposite surfaces in spaced parallel relation without play or sagging. This feature preserves an intimate contact between the ribbon 18 and the cylindrical surface of roller 13, so that traction therebetween is established by frictional engagement. Accordingly, manual turning of the handle 17 will propel the ribbon past the open upper end of case 5, and along the case and about the lower roller 12. Moreover, this tautness or tension serves to hold the rollers and ribbon in fixed position, after movement by handle 17 is terminated. As later set forth, this intimate contact between roller 13 and ribbon 18, is designed to serve a novel function.

Preferably, the present improvements contemplate the use of a mat-like fabric such as the ribbon 18, as distinguished from a chain or open-web-like conveyor. The employment of a fabric in this relation, provides the flexibility necessary to enable travel about the rollers, as well as the flexibility which is taken advantage of to provide a series of spaced fly mounts or pockets.

A fabric having a smooth slick face is preferable, such as oilcloth or plastic. If oilcloth is used, it may be made in a two ply thickness, with the slick faces, secured face to face, and the outermost ply would be provided with punch holes, thereby providing minute cavities within which the flies may be mounted. In the ribbon 18, as illustrated, a single thickness of plastic cloth is employed. This material has a slick surface, and to insure fly mounts with entirely slick surfaces, a plurality of runners or smaller ribbons 19, are laced transversely through the larger belt or ribbon 18. These laced ribbons 19 are provided at spaced intervals throughout the entire ribbon 18, thereby providing a plurality of spaced individual fly mounts for removably storing scores of individual flies.

It will be apparent that small slits are cut in the ribbon 18, to permit the lacing of the smaller ribbons 19. The latter are secured to ribbon 18, at their ends only, so that the overlapped faces mutually engage and provide a series of fly mounts 20, in the form of pockets, having slick contacting inner surfaces. As clearly seen in Figures 1 and 3, the barbs of the flies may be tucked in the pockets or mounts 20, which are designed to have a height so that the barb or hook will be concealed and not protrude, and hinder removal. Moreover, the smooth, slick, inner surfaces of the mount, insure ready removal and insertion of the fly without danger of the barb or hook becoming entangled in the pocket.

Figures 2, 3, 4:
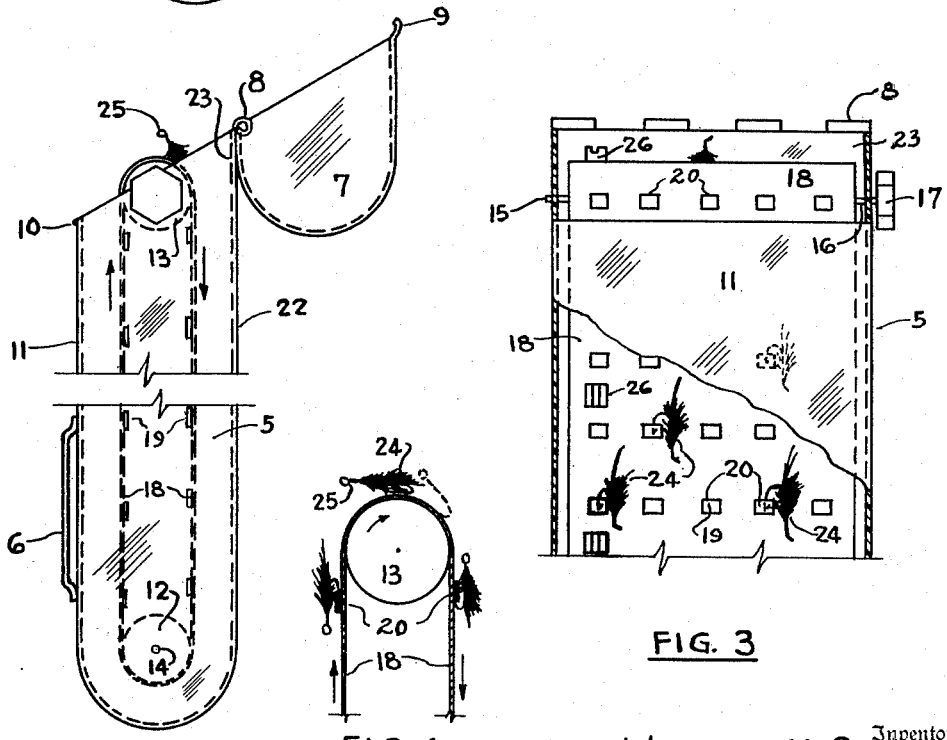
Figure 2 is a side elevation, broken away, of the device of Figure 1, with the cover removed, certain parts omitted.
Figure 3 is a fragmentary front face view, with cover omitted and some parts omitted.
Figure 4 is an enlarged fragmentary side section, illustrating in diagram and exaggerated form, various positions of travel of a fly about the open end of the case, with the case removed.

The inner walls of these pockets or mounts are maintained in engagement and in taut relation, so as to define a narrow sleeve or receptacle which will yield to the insertion of the barb of the fly and hold it by frictional engagement, thereby facilitating placement and replacement. Each fly is positioned in the pocket in a sideways or reclining position, that is to say, with the point and barb within the pocket and the remainder of the fly disposed substantially flush with the ribbon surface. As seen in Figures 1 and 3, the fly is held in reclining position beside the pocket rather than in front of it, because the hook-end with the barb extending inwardly, as illustrated, fits sideways within the narrow pocket. This contour of the hook preserves the reclining position and resists accidental movement therefrom. This refinement of construction greatly facilitates storage, as well as manual placement and replacement of the flies.

To conserve effort and expense, the illustration of the complete series of pockets has been omitted, a portion only being shown. However, it is understood that the ribbon 18, as shown in Figures 1 and 2, has sixteen smaller ribbons 19, laced through it. Since each smaller ribbon 19 defines five pockets or mounts 20, the full capacity of the case of this invention will be eighty mounts, for accommodating the same number of flies.

Each fly is mounted independently of the others, and so well spaced in all directions, that a fisherman, by quick inspection through the transparent case, can readily find the particular fly desired, without opening the cover. Thereupon, he may rotate the handle 17, and advance the ribbon until the desired fly arrives at the open end. The cover 7 may be removed and the desired fly taken out for use, while another fly may be put in its place for storage.

In the preferred operation of the device, the case may be held by hand, or in any one of a number of ways referred to at the beginning of this description. It is intended that the case be positioned so that face 11, is toward the user. When the cover 7 is dispensed with, the rear face 22, of the case may be extended above the roller 13, as at 23, thereby providing a windshield to protect the flies exposed about roller 13 from the wind. In situations where cover 7 is provided, it is designed to be held erect, as seen in Figure 2, so that its uppermost limits provide a windshield. It is apparent however, that these features may be dispensed with, and the open end of the case and the contiguous cover edges, disposed in a horizontal plane, rather than oblique as illustrated.

One of the features of the construction heretofore described, is the improved access provided to each fly, as well as the ability to thread a leader to a fly while it is still held secure in the case. Although this feature is illustrated in Figures 2 and 3, the enlarged Figure 4 has been added to further clarify it. In the latter figure, the arrows indicate the direction of travel.

In operation, as the handle 17, is turned clockwise, the ribbon 18 is advanced with the flies 24 reclined against it, as heretofore explained. However, as the desired fly approaches the open end of the case, the ribbon 18, cross ribbon 19 and the fly 24 in the pocket or mount 20, are engaged underneath by the cylindrical support, such as roller 13. As the ribbon 18 is taut and under tension, the further travel is now in an arc about roller 13. This tight, binding action causes the rigid eye-end of the fly to be elevated away from its reclining position, whereby the eye is moved away from the ribbon, as seen in full lines at the top of Figure 4. Upon further advance, the fly in an erect position (shown in dotted lines, Figure 4). In either of these positions, the fisherman may remove his hand from the handle 17, and the parts will remain stationary. He may then have both hands free to remove an unwanted fly from his line, store it in another pocket or mount 20, and then conveniently and easily thread the leader through the eye 25 of the fly 24, waiting at the crest of the ribbon (in Figure 4). This is done while the fly is still securely held in the mount, and the case is held in his vest pocket or elsewhere, without either hand being required to hold the case. The leader having been threaded and tied, the fly may now be manually slipped out of the pocket mount, and fishing resumed.

In achieving this novel feature, it is obvious that a similar result may be had, by moving the ribbon 18 over a fixed cylindrical support rather than over a cylindrical roller, as illustrated.

In either event, the cylindrical or curved surface, extending transversely beneath the ribbon from side to side, promotes the elevation and erection of the eye of the fly, away from the ribbon 18, to facilitate threading, or seizure by the fingers, irrespective of the location of the fly along the width of the ribbon 18.

As clearly illustrated and described heretofore, the laced ribbons 19, in the larger belt or ribbon 18, in defining the series of mounts or pockets 20, provide a firm grip on each fly, and hold each one in stationary position against unintentional or accidental movement. As previously stated, the illustration in Figure 4, is included to promote a clearer understanding of the improvements. However, it is to be understood, that each fly 24 (three of which are shown), is disposed sideways of the pockets or mounts 20, as seen in Figure 3. In showing the flies in Figure 4, before and after passing roller 13, as turned slightly away from the mounts 20, this detail is exaggerated so that pockets or mounts 20 will not be hidden from view.

As shown in Figure 3, if desired, a series of cork studs 26, may be mounted near the edge of ribbon 18, to accommodate a spare leader.

Various modifications may occur to those skilled in the art and may be adopted without departing from the scope and purview of the appended claims.

What I claim as my invention is:

1. A device for holding flies comprising an oblong casing having side and end walls and a semi-circular bottom, the end walls at their upper edges being inclined from the rear to the front side, a cover pivoted to the rear side at the upper ends of the inclined edges for pivotal movement, said cover having sides with inclined edges complementary to the side edges of the first named end walls, rollers within the casing, means for supporting the rollers, one of said roller supporting means being positioned in spaced relation to and parallel to the transverse axis of the bottom of the casing, the other roller supporting means being positioned below the inclined edges and parallel to the first supporting means, the roller on the second supporting means extending slightly above the inclined edges of the oblong casing, and a conveyor on the rollers, said conveyor having means to which the hook of a fly may be attached for holding the fly on the conveyor so that movement of the conveyor will position the fly with the eye thereof so located that the hand of an operator may engage the eye of the fly at points above the plane of the inclined edges of the end walls.

2. A device for holding flies comprising an oblong casing having side and end walls and a bottom wall, the end walls at their upper edges being inclined from the rear to the front side, a cover pivoted adjacent the upper ends of the said upper edges for pivotal movement, said cover having sides with edges disposed at an angle complementary to the upper edges of the end walls, rollers within the casing, means for supporting the rollers, one of said roller supporting means being positioned in spaced relation to and parallel to the transverse axis of the bottom of the casing, the other roller supporting means being positioned below the inclined edges and parallel to the first supporting means, the roller on the second supporting means extending slightly above the inclined edges of the oblong casing, and a conveyor on the rollers, said conveyor having means to which the hook of a fly may be attached for holding the fly on the conveyor so that movement of the conveyor will position the fly with the eye thereof so located that the hand of an operator may engage the eye of the fly at points above the plane of the inclined edges of the end walls.

3. A device for holding flies comprising an oblong casing having side and end walls and a bottom wall, at least one end wall at its upper edge being inclined from the rear to the front side, a cover pivoted to the rear side at the upper end of the said inclined edge for pivotal movement, said cover having a side with an inclined edge complementary to the upper edge of the first named end wall, rollers within the casing, means for supporting the rollers, one of said roller supporting means being positioned in spaced relation to and parallel to the transverse axis of the bottom of the casing, the other roller supporting means being positioned below the said inclined edge and parallel to the first roller supporting means, the roller on the second supporting means extending slightly above the said inclined edge of the end wall, and a conveyor on the rollers, said conveyor having means to which the hook of a fly may be attached for holding the fly on the conveyor so that movement of the conveyor will position the fly with the eye thereof so located that the hand of an operator may engage the eye of the fly at points above the plane of the inclined edge of the said end wall.

4. A device for holding flies comprising an oblong housing having side and end walls, the end walls at their upper edges being inclined from the rear to the front side, a cover for one end of said housing, said cover having inclined edges complementary to the upper edges of the first named end walls, rollers within the housing, means for supporting the rollers, one of said roller supporting means being positioned in spaced relation to and parallel to the transverse axis of the bottom of the housing, the other roller supporting means being positioned below the said inclined edges and parallel to the first supporting means, the roller on the second supporting means extending slightly above the inclined edges of the housing, and a conveyor on the rollers, said conveyor having means to which the hook of a fly may be attached for holding the fly on the conveyor so that movement of the conveyor will position the fly with the eye thereof so located that the hand of an operator may engage the eye of the fly at points above the plane of the inclined edges of the end walls.

5. A device for holding flies comprising an oblong enclosure having side and end walls, the end walls having upper edges disposed at an angle to the side wall edges, rollers within the enclosure, means for supporting the rollers, one of said roller supporting means being positioned parallel to the transverse axis of the enclosure and adjacent one end thereof, the second roller supporting means being positioned adjacent the opposite end of said enclosure and below the said upper edges and parallel to the first supporting means, the roller surface of the roller on the second supporting means extending at least to the plane of the said upper edges of the oblong enclosure, and a conveyor on the rollers, said conveyor having means to which the hook of a fly may be attached for holding the fly on the conveyor so that movement of the conveyor will position the fly with the eye thereof so located that the hand of an operator may engage the eye of the fly at points above the plane of the said upper edges of the end walls.

6. A device for holding flies comprising an oblong casing having side and end walls, said side walls comprising a front wall and a rear wall, terminating in parallel end edges, the end edge of the rear wall extending beyond the end edge of the front wall whereby said edges are in different planes parallel to the transverse axis of the casing, a cover for closing the casing, rollers within the casing, means for supporting the rollers being spaced from each other within the casing and mounted parallel to the transverse axis of the casing, one of said supporting means being positioned above the said end edge of said front wall, the roller on the last mentioned supporting means extending above the end edge of the front side wall and beneath the end edge of the rear side wall, a conveyor on the rollers, and means for actuating said conveyor, said conveyor having means to which the hook of a fly may be attached for holding the fly on the conveyor so that movement of the conveyor will position the fly with the eye thereof so located that the hand of an operator may engage the eye of the fly at points between the planes of the parallel end edges of the front and rear side walls.

WILLIAM M. STITELER.

References Cited in the file of this patent

UNITED STATES PATENTS

| Number | Name | Date |
| --- | --- | --- |
| 892,024 | Bengtson | June 30, 1908 |
| 1,266,091 | Basch | May 14, 1918 |
| 1,888,304 | Bekeart | Nov. 22, 1932 |
| 2,156,740 | Schweigert | May 2, 1939 |
| 2,246,626 | Grandin | June 24, 1941 |

FOREIGN PATENTS

| Number | Country | Date |
| --- | --- | --- |
| 576,299 | Great Britain | 1946 |